United States Patent [19]
Boedo

[11] Patent Number: 6,053,831
[45] Date of Patent: Apr. 25, 2000

[54] HYDRAULIC TENSIONER WITH PASSAGE OF VARIABLE CROSS-SECTION BETWEEN THE PISTON AND BORE

[75] Inventor: Stephen Boedo, Ithaca, N.Y.

[73] Assignee: Borg-Warner Automotive, Inc., Troy, Mich.

[21] Appl. No.: 09/207,843

[22] Filed: Dec. 8, 1998

[51] Int. Cl.[7] ................................ F16H 7/08; F16H 7/22
[52] U.S. Cl. ............................................ 474/109; 474/110
[58] Field of Search ................................ 474/109, 110, 474/111, 135, 138

[56] References Cited

U.S. PATENT DOCUMENTS

| | | | |
|---|---|---|---|
| 5,352,159 | 10/1994 | Suzuki et al. | 474/110 |
| 5,370,584 | 12/1994 | Todd | 474/110 |
| 5,595,549 | 1/1997 | Jarrand | 474/91 |
| 5,967,920 | 10/1999 | Dembosky et al. | 474/109 |

*Primary Examiner*—David A. Bucci
*Assistant Examiner*—Matthew A. Kaness
*Attorney, Agent, or Firm*—Sidley & Austin; Greg Dziegielewski

[57] ABSTRACT

A hydraulic chain tensioner has a fluid leakage passageway along the outside of the piston surface that has a variable cross-section. The tensioner has a tapered or stepped geometry in either the bore of the tensioner or in the piston or both the bore and the piston. Due to the unique geometry, friction is reduced, flow leakage is controlled, and the wear of the tensioner is improved.

10 Claims, 3 Drawing Sheets

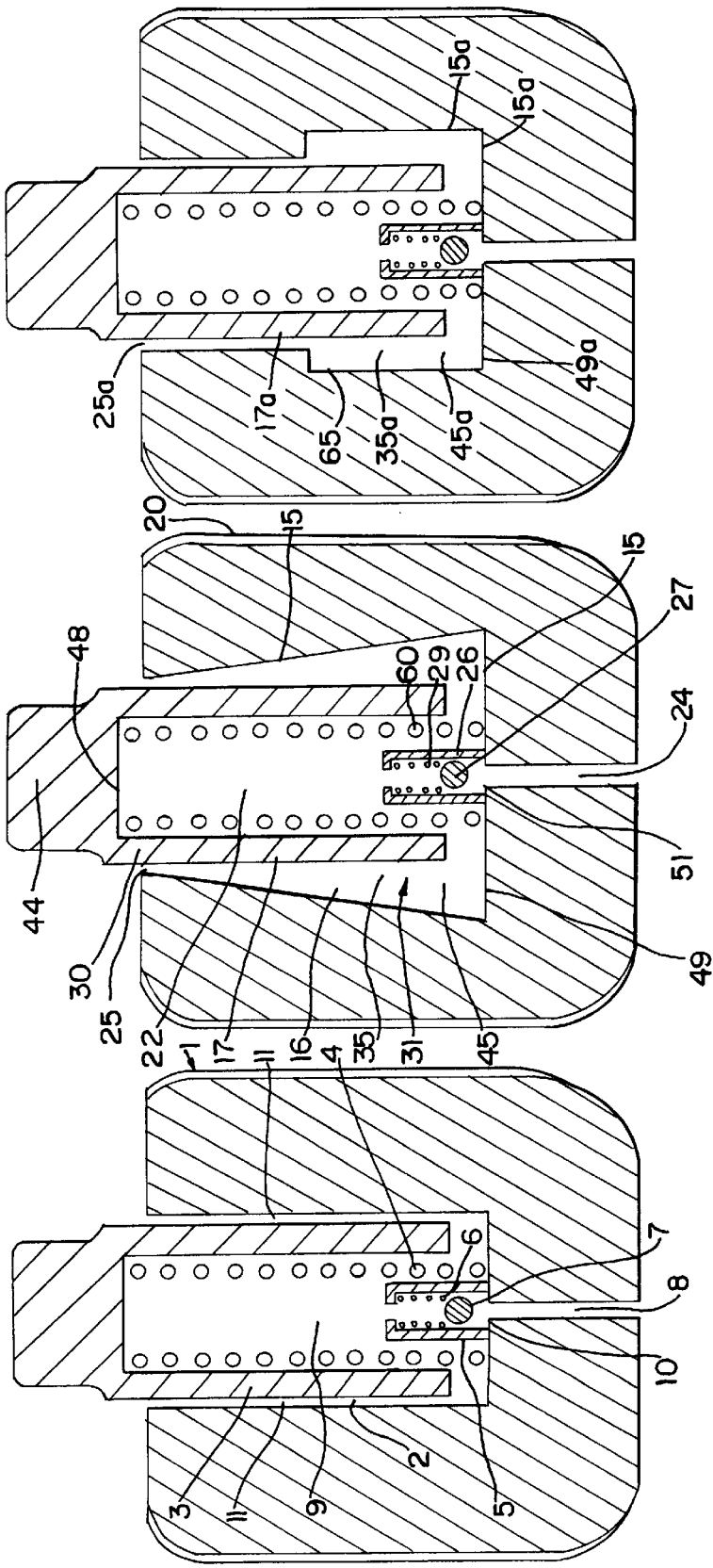

HYDRAULIC TENSIONER WITH PASSAGE OF VARIABLE CROSS-SECTION BETWEEN THE PISTON AND BORE

BACKGROUND OF THE INVENTION

The present invention relates to a hydraulic chain or belt tensioner having a tapered or stepped geometry in either the bore or the piston of the tensioner.

Hydraulic tensioners are typically used as control devices for chain or belt drives in an automotive engine timing system. Such chain or belt drives provide a driving connection from the crankshaft to the camshafts and to auxiliary devices, such as an oil or fuel pump. During typical operation, the tension in the chain or belt can vary greatly due to the dynamic shaft oscillations which are induced from engine firing, valve train loading, or auxiliary device operation. Moreover, chain or belt components typically wear during prolonged use thereby increasing the length of the chain or belt and decreasing the tension on the chain or belt. A hydraulic tensioner is used to take up the slack in the chain or belt and provide control of the chain or belt oscillations due to tension fluctuations.

A typical hydraulic tensioner of the prior art, as shown in FIG. 1, is comprised of a housing 1 having a cylindrical bore 2, and a hollow cylindrical piston 3 biased in a protruding direction from the bore 2 by a spring 4. Also included in the hydraulic tensioner is a check valve comprised of housing 5, spring 6, and check ball 7. The check ball 7 is large enough to close off oil supply passage 8. The check valve allows pressurized fluid to pass through passage 8 into the fluid chamber 9 (defined by hollow piston 3 and bore 2) through the check valve seat 10 and through holes in the check valve housing 5 while preventing flow in the reverse direction.

During typical operation of the tensioner, the piston 3 encounters forces not only from the chain and spring 4, but also fluid forces in the fluid chamber 9. When the chain is slack, the net force acts to move the piston axially outward of the bore, and thereby decreases the chamber fluid pressure to a value less than that of the supply pressure. This pressure drop allows pressurized fluid in the oil passage 8 to push the check ball 7 away from the seat 10 and allows oil to flow into the chamber 9. When the chain tightens, the net force acts to move the piston axially inward of the bore, resulting in an increase of pressure in chamber 9. The increase in pressure subsequently pushes the check ball 7 onto the seat 10, closing off the oil passage 8. The force of the chain inward on the piston is opposed by the fluid pressure in the chamber and the spring force. Any subsequent inward travel of the piston is thus dictated by the amount of oil which can escape or leak through the remaining clearance space 11 between the piston and bore.

The clearance space 11 and the size of the passage for leakage of oil are dictated by the orientation of the piston itself relative to the bore. For a cylindrical piston and bore, the centerline of the piston and bore are not necessarily parallel or coincident during operation, nor is there any mechanical means available to provide bore-piston concentricity. As a result, the orientation of the piston relative to the bore can become misaligned or non-concentric during operation, allowing for axial misalignment and radial motion of the piston relative to the bore. In particular, if the piston axis is at a maximum radial eccentricity relative to the bore, the oil flow may be up to 2.5 times greater than that obtained when both the piston and bore are concentric. This causes uncertainty in oil leakage and also causes uncertainties in chamber pressure and piston motion. Moreover, the possibility of relatively large eccentric piston positioning may result in higher friction, stiction, and increased wear.

Suzuki et al., in U.S. Pat. No. 5,352,159, address the problem of piston leakage. Suzuki et al. show a tensioner with a piston slidable within a cylinder that is divided into a low pressure chamber and high pressure chamber. A seal surrounds the upper end of the piston to prevent oil leakage, and a check valve allows oil flow from the low pressure to the high pressure chamber. An oil reservoir supplies oil to the low pressure chamber and has an opening to collect oil from oil mist within the engine and surrounding the tensioner. When the engine is non-operational for an extended period of time, the Suzuki et al. tensioner reservoir may leak and allow oil to drain from the fluid chamber and reservoir. If the oil drains out of the reservoir, the piston will draw air into the chamber at start-up. This causes excessive travel of the piston and noise during start-up and low pressure idle conditions. In addition, the Suzuki et al. tensioner is expensive to manufacture because of the cost of manufacturing each part of the tensioner separately.

An additional problem encountered by tensioners during operation is that, during leakage of oil around the piston, air may become trapped within the piston chamber. The air prevents the piston chamber from filling properly. Therefore, it is desirable to vent the air trapped in the piston chamber. A hydraulic tensioner that allows air to vent is shown in Todd, U.S. Pat. No. 5,370,584. A piston with a tapered base directs air upward to the vent, or gap, formed between the piston and piston cavity. Preferably, the tapered base is a tapered cone having a base to height ratio of 3:1.

As explained in Viersma, T. J., *Analysis, Synthesis, and Design of Hydraulic Servosystems and Pipelines*, Elsevier, 1980, electro-hydraulic servo cylinders and actuators, stepped and tapered pistons have been employed to reduce Coulomb friction and avoid stiction or momentary contact of the center piston rod and bore. The problem of stiction occurs when the piston rod is not kept concentric with the bore and catches on the side of the bore. Stepped and tapered rods have also been applied to machine tools, hydraulic presses, and flight simulators.

The problem of stiction between the piston and bore is decreased in the tensioner of the present invention by including tapers or steps in either the piston itself or the bore. According to the theory presented by Viersma, whenever the oil pressure in a tapered piston is greater on the side of the piston with the larger clearance than on the side that converges and provides a smaller clearance, film pressures are generated in the clearance area which in turn produce radial forces on the piston. If the piston is eccentric, the gap pressure or pressure at the point between the piston and the wall will be greater at points where the gap is the smallest, producing radial forces which will tend to align the bore and piston axes. As a result, friction is reduced for the larger oil films present, and the resulting oil flow through the gap can be better controlled.

SUMMARY OF THE INVENTION

The present invention is directed to a hydraulic chain tensioner having a passage for oil leakage of variable cross-section between the piston and bore. The passage is formed by using either a tapered or stepped bore. In another embodiment of the present invention, the hydraulic tensioner has a tapered or stepped piston. In yet another embodiment of the instant invention, the hydraulic tensioner has a combination of a tapered or stepped piston and a tapered or stepped bore. The tensioner of the present invention includes a housing with a central bore and a hollow piston slidably received within the bore, creating a fluid chamber with the bore. The piston or plunger, is biased in a protruding direction from the housing by a spring.

A passage is provided in the housing to connect the fluid chamber with a source of pressurized fluid. A check valve is provided between the fluid chamber and the source of pressurized fluid to permit fluid flow into the chamber, while blocking flow in the reverse direction. The check valve may be a ball and spring check valve, a spring valve, or a variable orifice check valve, as known in the tensioner art. The passage of variable cross-section to which the present invention is directed is between the outside of the piston and the surface of the bore.

Therefore, in one or more embodiments, a hydraulic tensioner includes a housing having a central bore with a central vertical axis, an inside surface and a base. The bore has an upper end, a middle portion and a lower end in the axial direction of the bore. The bore upper end has an upper end bore diameter. The bore middle portion has a middle bore diameter. The bore lower end has a lower end bore diameter. The bore diameters are defined as the distance across the inside surface of the bore in the radial direction at a specified point along the bore in the axial direction. The upper end, middle portion and lower end are defined as general areas along the fluid leakage passageway so that either the stepped or tapered features of the bore and piston can be provided to implement the intent of the present invention.

The tensioner includes a generally cylindrically shaped hollow piston having an inside portion and an outer surface. The piston is slidably received within the bore. The piston has an upper end, a middle portion, and a lower end. The piston upper end has an upper end diameter; the piston middle portion has a middle portion diameter; and, the piston lower end has a lower end diameter. The piston diameters are defined as the distance across the outer surface of the piston in the radial direction at a specified point along the piston in the axial direction.

The piston inside portion forms a fluid chamber with the base of the bore. The fluid chamber includes a first fluid leakage passage from the fluid chamber, which is formed between the outside surface of the piston and the inside surface of the bore. The first fluid leakage passage has an upper end, a middle portion and a lower end corresponding axially to the piston and bore upper end, middle portion and lower end.

The first fluid leakage passage has a first cross sectional area at the upper end between the outside surface of the piston at the piston upper end and the bore inside surface at the bore upper end. The first fluid leakage passage has a second cross sectional area located at the lower end between the outside surface of the piston lower end and the inside surface of the bore at the bore lower end. The first fluid leakage passage has a third cross sectional area at the middle portion between the outer surface of the middle portion of the piston and the inside surface of the middle portion of the bore.

A piston spring is located between the base of the bore and the inside of the piston. The piston spring biases the piston in an outward axial direction from the bore. A second fluid passageway in the housing connects the fluid chamber with a source of pressurized fluid. A check valve is located in the second fluid passageway between the fluid chamber and the source of pressurized fluid. The check valve acts to permit fluid flow into the fluid chamber while blocking flow in the reverse direction. The passageway of variable cross section area is formed by having the first cross sectional area of the first fluid leakage passageway being smaller than the second cross sectional area of the first fluid leakage passageway.

In one embodiment, the bore is tapered along said first fluid leakage passageway such that the lower end bore diameter is greater than upper end bore diameter. In one preferred embodiment, the upper end piston diameter is approximately 0.001 inches less than the upper end bore diameter, and the lower end piston diameter is approximately 0.002 inches less than the lower end bore diameter. Other embodiments are described in the following detailed description.

BRIEF DESCRIPTION OF THE DRAWINGS

In the drawings, which are not to scale:

FIG. 1, is a sectional view of a conventional hydraulic tensioner of the prior art incorporating cylindrical piston and bore.

FIG. 2 is a sectional view of a first embodiment of the hydraulic tensioner of the present invention, incorporating a tapered bore and cylindrical piston.

FIG. 3 is a sectional view of a second embodiment of the hydraulic tensioner of the present invention, incorporating a stepped bore and cylindrical piston.

DETAILED DESCRIPTION OF THE PREFERRED EMBODIMENTS

Figure 4:
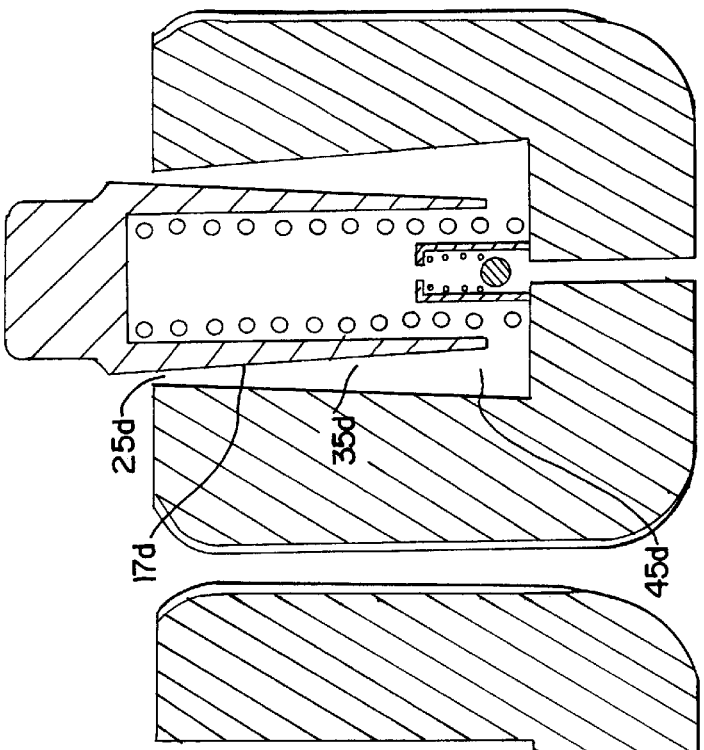
FIG. 4 is a sectional view of a third embodiment of the hydraulic tensioner of the present invention, incorporating a cylindrical bore and tapered piston.

FIG. 2 illustrates the first embodiment of the hydraulic tensioner of the invention having a housing 20 with a bore 15, and a fluid chamber 22 filled with fluid through a passageway 24 from a pressurized fluid source (not shown). The fluid source may be an oil pump or a reservoir. The chamber 22 receives a hollow piston 30 having an upper end 44. The piston 30 moves relative to the bore 15.

The fluid chamber includes a passage for oil leakage of variable cross-section along the outside of the piston between the piston and the bore. The passage 31 is enlarged with respect to the other components in the drawings for purposes of illustration. Fluid moving along this narrow passage forms a lubricating film that separates bore surface 16 and piston surface 17 within a clearance gap 35. In the preferred embodiments, the cross sectional area of the passage varies along the axial length of the piston. The cross sectional area is defined as the area in a horizontal plane (see FIG. 2) of the spacing formed between the bore and the outside of the piston around the circumference of the bore and piston.

The tensioner has at least three different cross sectional areas. A first cross sectional area is located at the upper end of the bore at gap 25. A second cross-sectional area is located at the lower end of the bore at gap 45. A third cross sectional area is located at a midpoint between the upper end and the lower end of the bore at gap 35. The gap or passage cross-sectional area at a particular point along the piston will be the difference between: (1) the area defined by the inner diameter of the bore at that point, and (2) the area defined by the outer diameter of the piston at that point. The cross sectional area varies along the axial length of the piston as the diameter of the piston and/or diameter of the bore vary along that axial length.

The top end of the piston 44 which extends beyond the upper end contacts a lever or arm (not shown) to provide tension along a chain strand (not shown). A spring 60 contacts the inside 48 of the piston and the base 49 of the bore to bias the piston 30 in a protruding or outward direction from the tensioner. In this first embodiment, the piston surface 17 is cylindrical, while the bore surface 16 is tapered such that the bore diameter at the base 49 is larger than the bore diameter at the opening 25. For illustrative purposes, the taper is shown to vary linearly in FIG. 2, although the taper need not be limited to such linear variation. Preferably, the clearance gap 35 varies on the order of 0.002 inches at the base 49 to on the order of 0.001 inches at the opening 25 when piston and bore aligned concentrically. However, the amount of linear variation is well within the skill of one of ordinary skill in the art.

When the pressure at the larger gap end 45 is greater than the ambient pressure at smaller gap end 25, an axial and radial pressure distribution is generated within the gap 35 itself, thereby producing radial forces and subsequent radial piston motion which tends to align the bore 15 and piston 30 axes. The hydrodynamic oil film which is created in this manner between the outside of the piston and the inside of the bore reduces the possibility for metal-to-metal contact and hence reduces friction between the bore 15 and piston 30. In addition, there will be a greater predictability of the rate of oil flow through the gap 35, allowing for greater reliability in the operation of the tensioner device.

A check valve is provided between the chamber 22 and the passageway 24 to the source of fluid pressure to permit fluid flow into the chamber 22 while blocking fluid flow in the reverse direction. Any check valve which permits fluid flow into the chamber while blocking flow in the reverse direction to the passageway can be used. Typically, a check valve includes check ball 27, ball retainer housing 26, and spring 29. The check valve may be a variable orifice check valve as shown and described in U.S. Pat. No. 5,259,820 and U.S. Pat. No. 5,277,664, both of which are owned by the assignee of the present application and both of which are incorporated herein by reference.

During typical operation, the piston 30 encounters forces from the chain, spring 60, and fluid in the fluid chamber 22. When the chain is slack, the force due to the spring 60 acts to move the piston axially outward of the bore. Such outward movement causes the pressure in the chamber 22 to drop and form a differential pressure across the valve. This pressure differential across the valve allows pressurized fluid in the oil passage 24 to push the check ball 27 away from a seat 51 in the housing base 49 and allows oil to enter and fill the chamber 22. As the chain tightens, the chain force acts to move the piston axially inward of the bore, which is opposed by the fluid pressure in chamber 22 and spring force from spring 60. This fluid pressure pushes the check ball 27 onto the seat 51, closing off the oil passage 24.

In a second embodiment of the present invention, as shown in FIG. 3, the tensioner bore 15a has a step 65, rather than being tapered. The piston surface 17a remains cylindrical. However, in this embodiment, the bore surface 65 is stepped such that the bore diameter is greater at the base 49a than that at the opening 25a. The advantage of steps is that the pressure distribution is more easily determined, which is important when tilting moments are considered. Also, from a manufacturing viewpoint, steps may be easier to form than tapers. As explained with regard to the first embodiment, when the pressure at the gap end 45a is greater than the ambient pressure at the opening 25a, the hydrodynamic film will be produced and the pressure distribution will provide radial centering forces on the piston in the gap 35a.

Embodiments three through eight of the present invention, as illustrated in FIGS. 4–9, incorporate various combinations of tapers and steps in both bore and piston. The essential feature common to each of these embodiments is a gap 45b–45g at the base of the piston which differs in size from the gap 25b–25g at the opening of the bore.

Figure 5:
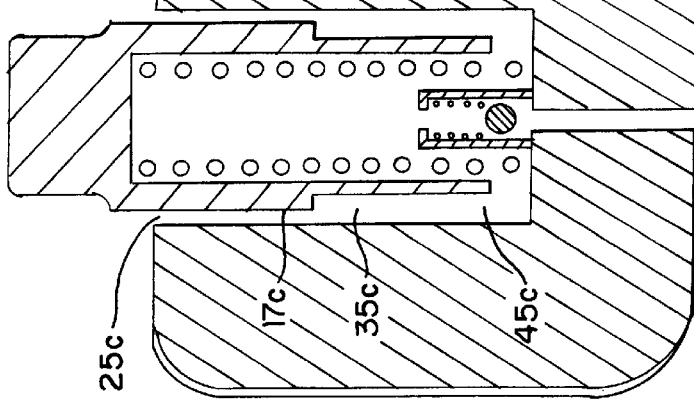
FIG. 5 is a sectional view of a fourth embodiment of the hydraulic tensioner of the present invention, incorporating a cylindrical bore and stepped piston.
Figure 6:
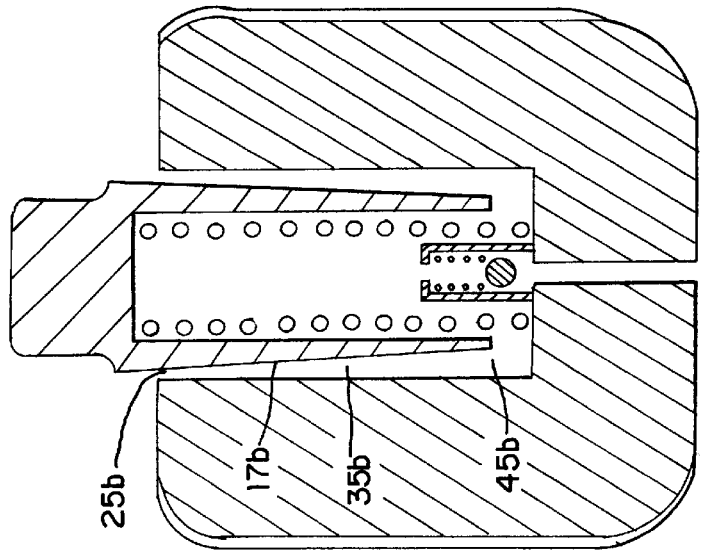
FIG. 6 is a sectional view of a fifth embodiment of the hydraulic tensioner of the present invention, incorporating a tapered bore and tapered piston.
Figure 7:
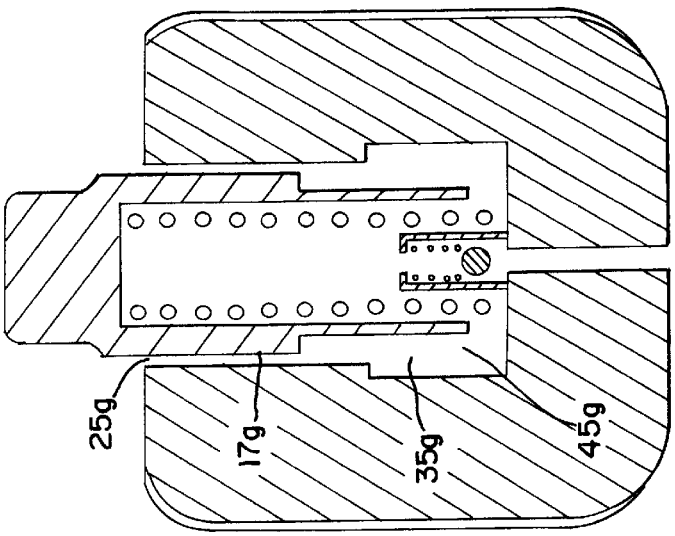
FIG. 7 is a sectional view of a sixth embodiment of the hydraulic tensioner of the present invention, incorporating a tapered bore and stepped piston.
Figure 8:
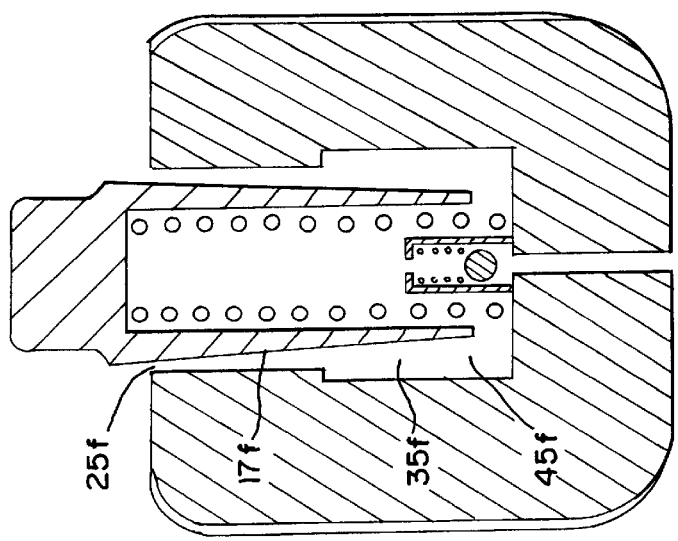
FIG. 8 is a sectional view of a seventh embodiment of the hydraulic tensioner of the present invention, incorporating a stepped bore and tapered piston.
Figure 9:
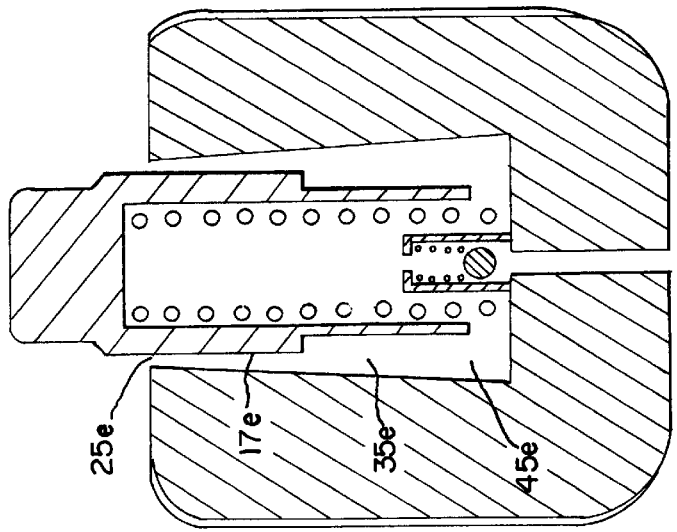
FIG. 9 is a sectional view of an eighth embodiment of the hydraulic tensioner of the present invention, incorporating a stepped bore and stepped piston.

FIG. 4 illustrates an embodiment of the chain tensioner in which the piston is tapered. FIG. 5 illustrates an embodiment of the instant invention in which the piston is stepped. Another embodiment of the instant invention is illustrated in FIG. 6 in which both the bore and the piston are tapered. FIG. 7 shows yet another embodiment in which the piston is stepped, whereas the bore is tapered. In FIG. 8, the piston is tapered while the bore is stepped. In still yet another embodiment illustrated in FIG. 9, both the piston and the bore are stepped.

The depth and location of the geometry of either the piston and/or bore are well within the skill of one of ordinary skill in the art, provided, however, that the gap between the base of the piston is larger than the gap at the opening between the upper end of the piston and the bore. Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials, and the like would be apparent to those skilled in the art, yet still fall within the scope of the invention.

What is claimed is:

1. A hydraulic tensioner comprising:

a housing having a central bore with a central vertical axis, an inside surface and a base; said bore having a bore upper end, a bore middle portion and a bore lower end in the axial direction of said bore; said bore upper end having an upper end bore diameter, said bore middle portion having a middle bore diameter, said bore lower end having a lower end bore diameter, said bore diameters being defined as the distance across the inside surface of the bore in the radial direction at a specified point along the bore in the axial direction;

a generally cylindrically shaped hollow piston having an inside portion and an outer surface, said piston slidably received within said bore, said piston having a piston upper end, a piston middle portion, and a piston lower end, said piston upper end having an upper end diameter, said piston middle portion having a middle portion diameter and said piston lower end having a lower end diameter, said piston diameters being defined as the distance across the outer surface of the piston in the radial direction at a specified point along the piston in the axial direction;

said piston inside portion forming a fluid chamber with the base of said bore, said fluid chamber including a first fluid leakage passage from said fluid chamber, said first fluid leakage passage formed between the outside surface of said piston and the inside surface of said bore, said first fluid leakage passage having an upper end, a middle portion and a lower end corresponding axially to said piston and said bore upper end, middle portion and said lower end;

said first fluid leakage passage having a first cross sectional area at said upper end between the outside surface of said piston at said piston upper end and said bore inside surface at said bore upper end; said first fluid leakage passage having a second cross sectional area located at said lower end between the outside surface of said piston lower end and said inside surface of said bore at said bore lower end; said first fluid leakage passage having a third cross sectional area at said middle portion between said outer surface of said middle portion of said piston and said inside surface of said middle portion of said bore;

a piston spring located between the base of said bore and the inside of said piston, said piston spring biasing said piston in an outward axial direction from said bore;

a second fluid passageway in the housing connecting the fluid chamber with a source of pressurized fluid; a check valve located in said second fluid passageway between said fluid chamber and said source of pressurized fluid, said check valve acting to permit fluid flow into the fluid chamber while blocking flow in the reverse direction; and, said first cross sectional area of said first fluid leakage passageway being smaller than said second cross sectional area of said first fluid leakage passageway.

2. The hydraulic tensioner according to claim 1, wherein said bore is tapered along said first fluid leakage passageway such that said lower end bore diameter is greater than said upper end bore diameter.

3. The hydraulic chain tensioner according to claim 1, wherein said upper end piston diameter is approximately 0.001 inches less than said upper end bore diameter, and said lower end piston diameter is approximately 0.002 inches less than said lower end bore diameter.

4. The hydraulic chain tensioner according to claim 1, wherein said bore surface along said first fluid leakage passageway is stepped, said lower end bore diameter being substantially the same as said middle portion bore diameter, said upper end bore diameter being less than said middle portion bore diameter.

5. The hydraulic chain tensioner according to claim 1, wherein said piston outer surface along said first fluid leakage passageway is tapered, said upper end piston diameter being greater than said lower end piston diameter.

6. The hydraulic tensioner according to claim 1, wherein said piston outer surface along said first fluid leakage passageway is stepped, said piston upper end diameter is substantially the same as said piston middle portion diameter, said piston lower end diameter being less than said piston upper end diameter.

7. The hydraulic tensioner according to claim 1, wherein said piston outer surface along said first fluid leakage passageway is tapered, said piston upper end diameter being greater than said piston lower end diameter.

8. The hydraulic tensioner according to claim 1, wherein said piston outer surface is stepped and bore inner surface is tapered along said first fluid leakage passageway, said piston upper end diameter being substantially the same as said piston middle portion diameter, said piston lower end diameter being less than said piston upper end diameter, said bore lower end diameter being greater than said bore upper diameter.

9. The hydraulic tensioner according to claim 1, wherein said piston is tapered inwardly along its outer diameter and said bore inner surface is stepped along said first fluid leakage passageway, said piston upper end diameter being greater than said piston lower end diameter, said lower end bore diameter being substantially the same as said bore middle portion diameter, said bore upper end diameter being less than said bore lower end diameter.

10. The hydraulic tensioner according to claim 1, wherein said piston outer diameter is stepped and said bore inside surface is stepped along said first fluid leakage passageway, said bore lower end diameter being substantially the same as said bore middle portion diameter, said bore upper end diameter being less than said bore lower end diameter, said piston upper end diameter being substantially the same as said piston middle portion diameter, said piston lower end diameter being less than said piston upper end diameter.

* * * * *